2,627,303

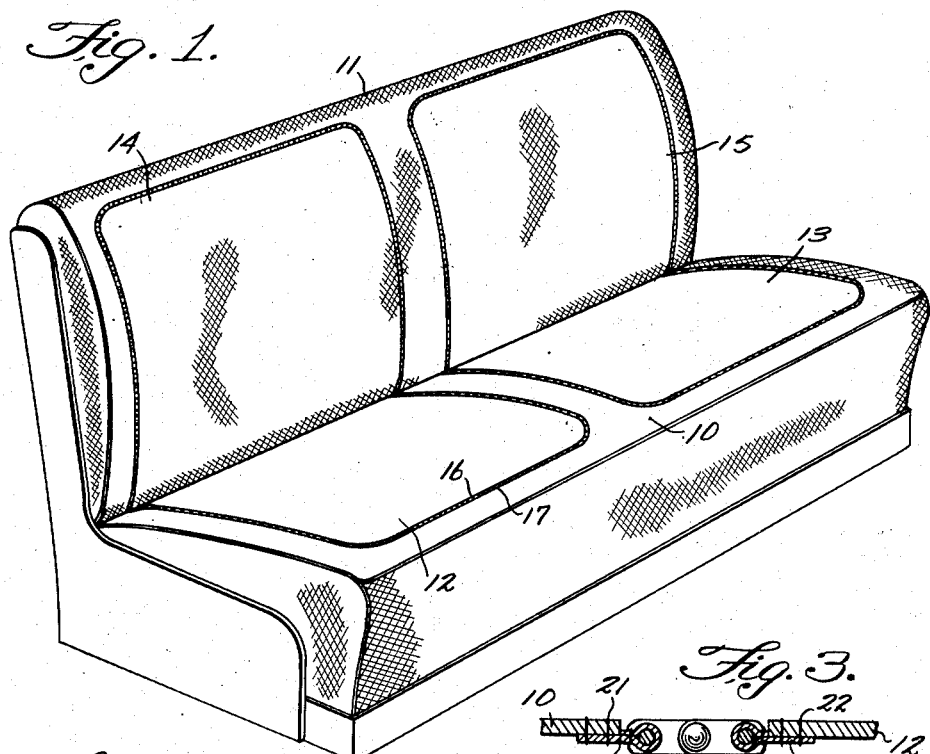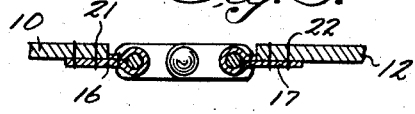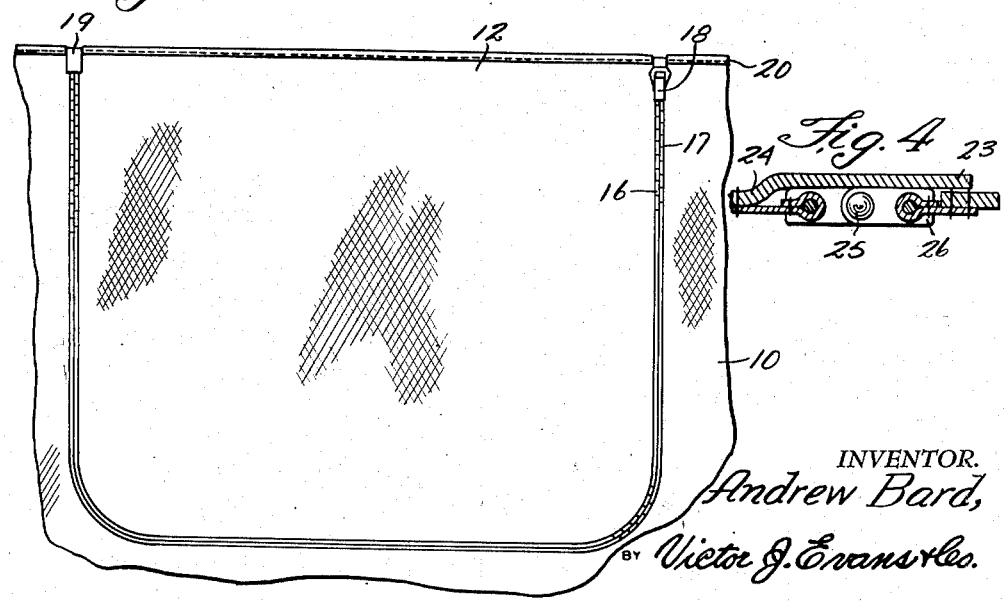
INVENTOR.
Andrew Bard,
BY Victor J. Evans & Co.
ATTORNEYS Patented Feb. 3, 1953

UNITED STATES PATENT OFFICE 2,627,303

SEAT COVER WITH CHANGEABLE SECTIONS

Andrew Bard, San Bernardino, Calif.

Application March 26, 1948, Serial No. 17,242

3 Claims. (Cl. 155—182)

1

This invention relates to seat covers particularly of motor vehicle seats and backs thereof, and in particular seat covers having changeable and interchangeable sections therein wherein as parts of the covers wear or become discolored they may be replaced with new sections or with sections of a different color.

The purpose of this invention is to provide means for readily removing and replacing sections of seat covers particularly of seats of pleasure cars so that the worn or discolored sections may be discarded without discarding the entire seat cover.

Seat covers of motor vehicles and particularly of pleasure cars discolor and wear rapidly particularly under the operator and at the back behind the operator and as it is difficult to repair the worn portions of the seat cover the entire seat cover is discarded although the remainder thereof is in good condition. With this thought in mind this invention contemplates seat covers for motor vehicles with removable sections or inserts therein in which the sections are attached by separable fasteners or the like so that they may readily be removed and replaced.

The object of this invention is, therefore, to provide means for removably mounting sections in seat covers for seats of motor vehicles wherein sections of the covers may be removed and replaced without removing and discarding the entire cover.

Another object of the invention is to provide seat covers with replaceable sections wherein as sections of a cover wear new sections may be purchased and installed in place of the worn sections by the average layman.

Another object of the invention is to provide seat covers for seats of motor vehicles in which removable sections therein may be removed and replaced in a comparatively few minutes.

A further object of the invention is to provide removable sections in motor vehicle seat covers that may readily be removed and replaced in which the entire seat cover is comparatively simple and inexpensive.

With these and other objects and advantages in view the invention consists of the new and novel combination, construction and arrangement of parts as hereinafter more fully described, set forth in the claims appended hereto, and disclosed in the accompanying drawings forming part hereof, wherein:

Figure 1 is a view showing a motor vehicle seat having a seat cover with removable sections therein applied thereto.

Figure 2 is a plan view showing a portion of a seat cover with a section therein having a separable fastener extending around three sides thereof and with the other side corresponding with the edge of the cover.

Figure 3 is a cross section through the fastener showing the adjoining edges of a seat cover and a removable section therein.

Figure 4 is a similar section showing a modification wherein the usual flap is provided for covering the separable fastener.

Referring now to the drawings wherein like reference characters denote corresponding parts the improved seat cover with the replaceable sections therein of this invention includes a seat cover having a seat portion 10 with a back portion 11, with removable sections or inserts 12 and 13 in the seat portion and 14 and 15 in the back.

As illustrated in Figure 2 the section 12 is mounted in the seat 10 with a separable fastener having a stringer 16 on the seat portion, a stringer 17 on the removable section 12, a slider 18, and a separable clip 19. The slider and clip may be positioned on the rear edge 20 of the seat cover and this edge may extend downward into the crease between the seat and back, as illustrated in Figure 1. The stringer 16 is attached to the seat 10 by stitches 21, and the stringer 17 is attached to the removable section 12 by stitches 22, as shown in Figure 3. The stringers may, however, be secured to the edges of the material of the seat cover and removable section thereof by any suitable means.

In the design shown in Figure 4 the separable fastener is formed with a Leatherette binder or the like and this is provided with a flap 23 that extends from the section 24 over a fastener 25 with one stringer of the fastener on the cover 26. By this means the fastener is not visible when it is completely closed.

The seat cover is illustrated as particularly adapted for use on motor vehicle seats and backs thereof, however, it will be understood that seat covers with removable sections may be used on furniture or seats used for any other purpose.

Seat covers having removable sections of this type may be supplied with a plurality of interchangeable sections of different colors wherein the different colors may be used for different purposes, and a light color may be used in summer and a dark color in winter, as an illustration. With the sections mounted in this manner they may be removed and replaced in a comparatively few minutes, and without the services of an expert.

It will be understood that other modifications may be made in the design and arrangement of

What is claimed is:

1. In a seat cover, the combination which comprises a seat portion and a back portion, said seat and back portions having openings therein and said openings terminating at the rear edge of the seat portion and bottom edge of the back portion, inserts nested in said openings, and separable fasteners temporarily connecting the meeting edges of the inserts and seat and back portions.

2. In a seat cover, the combination which comprises a seat portion and a back portion, said seat and back portions having openings of equal size therein and said openings terminating at the rear edge of the seat portion and bottom edge of the back portion, inserts nested in said openings, and separable fasteners temporarily connecting the meeting edges of the inserts and seat and back portions, said fasteners being positioned between said meeting edges of the inserts and seat and back portions whereby the upper surfaces of the seat and back portions of the seat cover are smooth.

3. In a seat cover, the combination which comprises a seat portion and a back portion, said seat and back portions having openings of equal size therein and said openings terminating at the rear edge of the seat portion and bottom edge of the back portion, inserts nested in said openings, separable fasteners temporarily connecting the meeting edges of the inserts and seat and back portions, said fasteners being positioned between said meeting edges of the inserts and seat and back portions whereby the upper surfaces of the seat and back portions of the seat cover are smooth and flaps positioned to extend over the meeting edges of the inserts and seat and back portions of the seat cover for covering said separable fasteners.

ANDREW BARD.

REFERENCES CITED

The following references are of record in the file of this patent:

UNITED STATES PATENTS

| Number | Name | Date |
|---|---|---|
| 1,636,885 | Wells | July 26, 1927 |
| 1,908,233 | Fisher | May 9, 1933 |
| 1,917,904 | Sallop | July 11, 1933 |
| 2,344,093 | Kotowicz | Mar. 14, 1944 |